United States Patent [19]

Carman et al.

[11] Patent Number: 4,924,088

[45] Date of Patent: May 8, 1990

[54] APPARATUS FOR READING INFORMATION MARKS

[76] Inventors: George Carman, 2961 NW. Jackson Ave.; Joseph G. LaChapelle, 6050 NW. Happy Valley; Mark Hiatt, 2335 NW. Arthur, all of, Corvallis, Oreg. 97330

[21] Appl. No.: 317,529

[22] Filed: Feb. 28, 1989

[51] Int. Cl.⁵ .............................................. G06K 7/10
[52] U.S. Cl. .................................... 250/271; 235/468; 235/464; 209/576; 209/577; 209/578; 209/580; 209/583
[58] Field of Search ................. 250/271; 235/468, 469; 209/576, 577, 578, 580, 583

[56] References Cited

U.S. PATENT DOCUMENTS

| | | |
|---|---|---|
| 3,666,946 | 5/1972 | Trimble .............................. 250/271 |
| 3,734,286 | 5/1973 | Simjian .............................. 209/583 |
| 4,544,064 | 10/1985 | Felder ................................ 209/583 |

Primary Examiner—Jack I. Berman
Attorney, Agent, or Firm—Charles N. Hilke

[57] ABSTRACT

An apparatus for reading information marks comprising a strobe light activating or reflecting information marks manually placed on objects or wood products. A camera is used for reading the marks. One or more detectors are used to recognize marks and color. A central processing unit is used to process, solve and interpret character and color recognition. A photo-electric eye or a signal from a control device is used to time the strobe and detector. The information contained in the marks is fed directly to the control system and may be used to generate reports.

25 Claims, 2 Drawing Sheets

APPARATUS FOR READING INFORMATION MARKS

BACKGROUND OF THE INVENTION

1. Field of the Invention

This invention relates to an apparatus for reading information marks and, more particularly, an apparatus for reading fluorescent information marks in the wood products industry.

2. Prior Art

This invention replaces a key entry operator who would key in the information from the marks to an automatic trimmer. Electronic devices already in the prior art include a black and white line camera which used fluorescent marks on a piece of lumber. A fluorescent light, but not a strobe, was used to excite the fluorescent marks. A central processing unit enhances the character recognition. Color could not be recognized.

In a lumber production operation, for example, producing two by fours, the cut lumber is graded twice. Once after it is first cut into 2×4 (greenend) and second, after kiln drying, at the planer end. Information marks are placed on the lumber which grade the quality of the lumber and require cutting some length off the two by four. An error rate is calculated from the mis-read or mis-entered information. If a mark is not entered or not read, it will be sorted into a rerun bin and run through the system again. A mis-trimmed board will count in the error rate.

The problems in this area include speed, accuracy and, in the electronic version, technical. The manual system requires a person to read the lumber marks and key the number into the trimmer. This invention is substantially quicker by means of the reading of the lumber marks electronically and eliminating the key-in requirement. Additionally, this invention is directly connected to the trimmer.

With respect to accuracy, eliminating the key-in increases accuracy by decreasing the opportunities for error. Furthermore, direct transfer from reader to trimmer enhance accuracy.

Technical problems, particularly reading a moving, bouncing, vibrating board, have limited electronic devices in the area. By use of a rapid strobe, the board appears stationary. Furthermore, the rapid strobe also eliminates any problem of uneven chain movement. Finally, the camera used is different from a linear (line) camera.

SUMMARY OF THE INVENTION

An apparatus for reading information marks with at least one rapid strobe light which activates or reflects marks on objects or wood products. The strobe light with a filter operates at a sufficiently rapid rate so that vibration and movement of each piece of wood does not affect the camera reading the information marks. The camera in one embodiment, is a single camera which separates colors into red, green and blue. A signal ratio algorithm is used whereby different colors are detected. In another embodiment two or more cameras with different filters are used and the signal levels per threshold in each camera is compared to determine the color of the information marks. A central processing unit processes, solves and interprets character and color recognition. The solution is tranferred to other control system devices and/or reporting system devices. In addition, a monitor can display in real time or later the character and color read by the apparatus on each piece of wood.

It is an object of this invention to provide an inexpensive, cost efficient, information reader.

It is another object of this invention to be able to detect and evaluate the individual markers.

Another further object is to provide a quick and accurate information reader.

A further object is to provide a durable lumber grade reader in limited space.

A final object is to provide an information reader which easily interfaces with trimmer/sorter controls.

DESCRIPTION OF THE PREFERRED EMBODIMENTS

Figure 1:
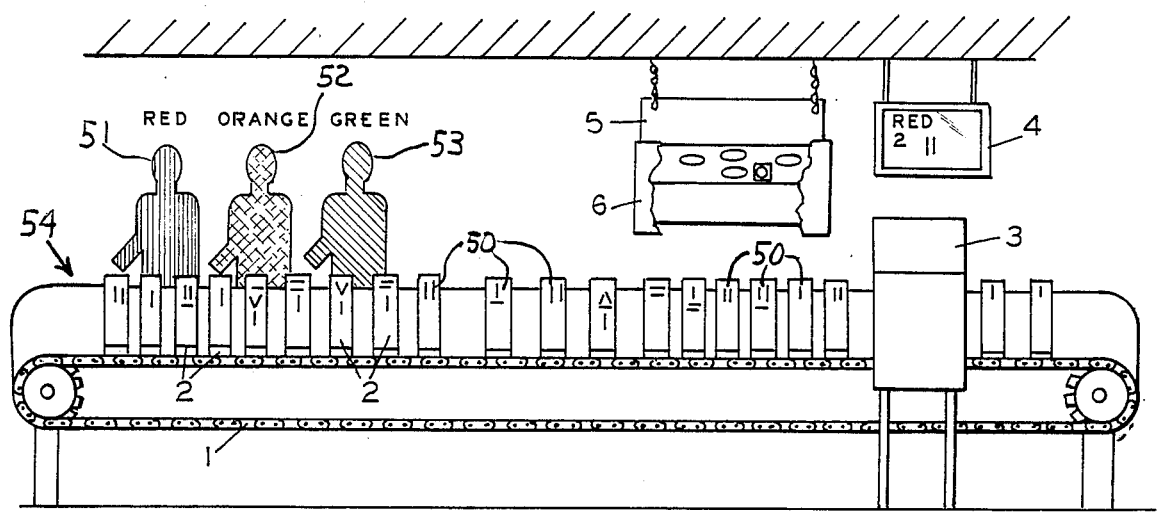
FIG. 1 is an overall view of the production line with the invention positioned on the line.

FIG. 1 shows the production line 54. A conveyor or lugged chain moves the wood product 2 along the production line 54. Individual graders 51,52,53 use different color markers. Information marks 50 are placed on each wood product 2. The information marks contain information relating to the grade of the wood product and relating to any trimming of the wood product. The information reading apparatus 5 fits over the production line 54 with a skirt 6. A video screen 4 and a trimmer 3 are shown. The information marks may be reflective or active. It is preferred that the information marks 50 be made by fluorescent markers. For convenience three colors are shown; the preferred embodiment is not limited to the number of colors shown.

Figure 2:
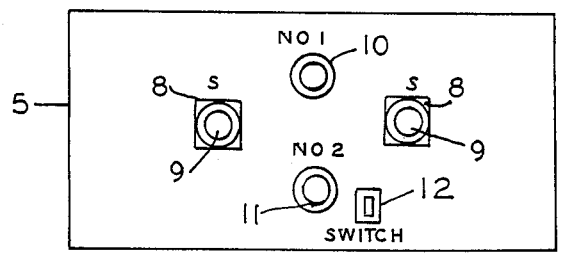
FIG. 2 is a bottom view of the invention.

FIG. 2 is a bottom view of the information reading apparatus 5. Square strobe openings 8 allow the light from the strobe 9 to emit. Two cameras 10 and 11 are enclosed within the information reading apparatus 5. A switch 12 is used to turn the apparatus 5 on. While two cameras and two strobes are shown, one camera and one strobe are included within the preferred embodiment. An RGB camera can be used.

Figure 3:
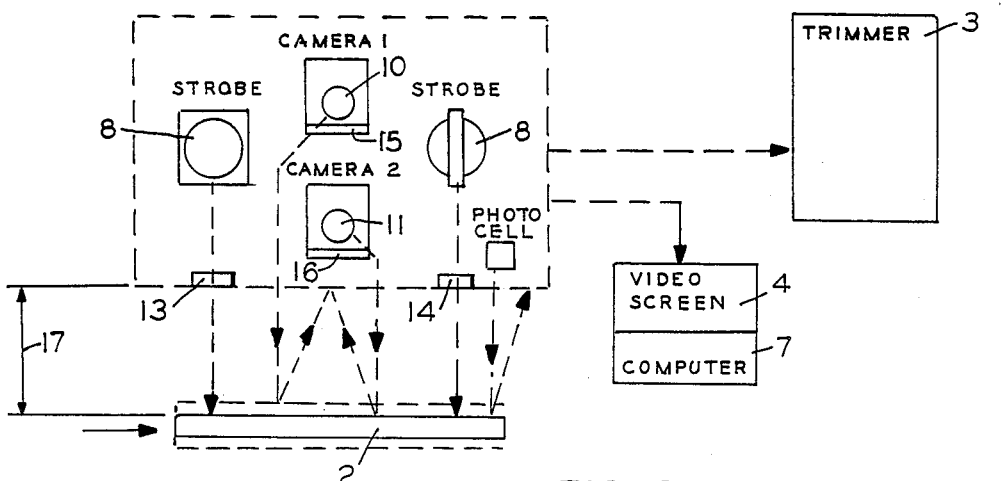
FIG. 3 is a combined bottom and side view of the invention on the production line with schematic connection to other devices.

FIG. 3 shows a UV filter 13 on strobe 8 and a UV filter 14 on the other strobe 8. Camera 10 uses filter 15 and camera 11 uses filter 16. A photocell is used to time the strobes 8. The wood product 2 is shown a stand-off distance 17 from the information reading apparatus 5. Only one piece of wood product 2 appears under the apparatus at a time. In addition, the bottom of the skirt 6 (see FIG. 1) brushes against the wood product 2 as it passes under the apparatus 5. The trimmer 3 and video screen 4 and computer 7 communicate with the apparatus 5.

Figure 4:
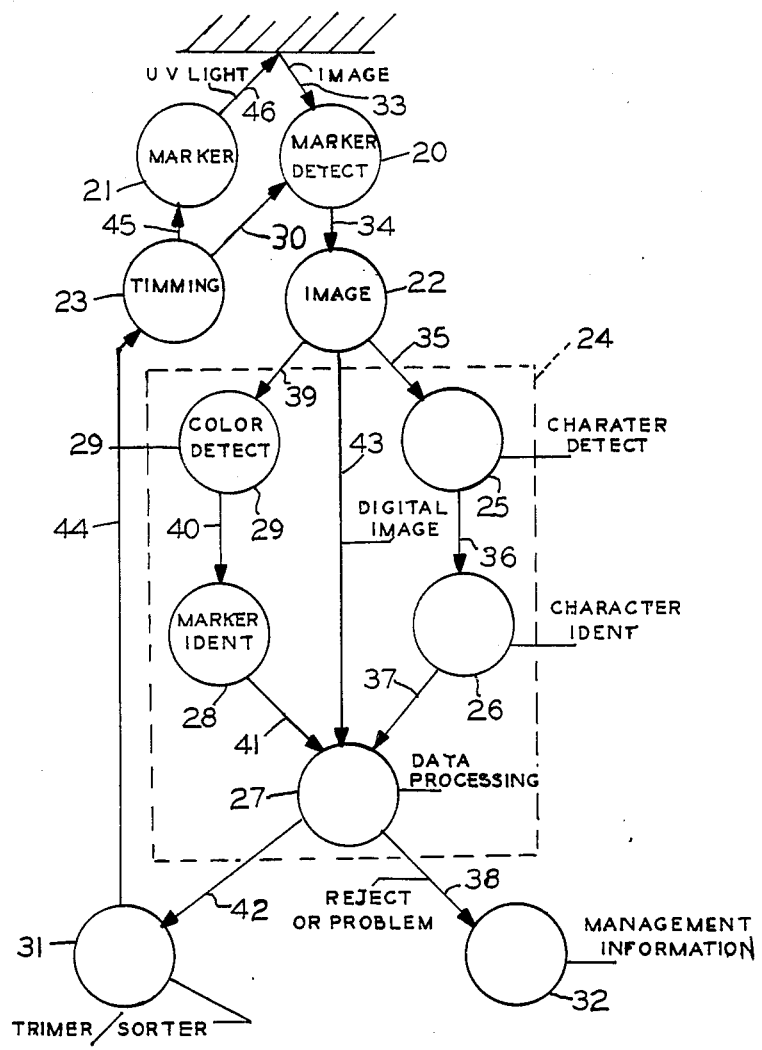
FIG. 4 is a system flow diagram.

FIG. 4 is the general preferred system flow diagram. The process controls 31 signal 44 the timing generator 23. The timing generator 23 may also be signalled by an encoder (not shown) on the conveyor 1. The timing generator 23 by means of the timing length 45 triggers the marker exciter source 21 generally a strobe. In addition, the timing generator 23 signals the marker detection (camera) 20 triggering an electronic shutter. The strobe 21 produces UV light 46 which strikes the marks 50 causing an image detected by the marker detection 20. The video image 34 is transferred to the image pre-processing 22. Image processing 22 provides analog data 39 to the color detection 29 which then transfers the marker code 40 to the marker identification 28. The diagram data 35 from the image pre-processing 22 is sent to the character recognition 25 and then the coded character 36 is transferred to the character identification 26. Character identification 26 sends the process solution to data processing 27 and the marker identification 28 sends the identity 41 to the data processing 27. In addition, the image pre-processing 22 by means of a digital image 43 sends the information directly to data processing 27. The identity and solution 38 from the data processing 27 is sent to a management information system 32 and the process commands 42 are sent to the process controls 31, generally a trimmer/sorter. The central processing unit 24 is shown.

In operation, one of the individual markers 51,52,53 examines a board 2 and places marks 50 on the board 2 indicating the grade of the board 2 and any trimming that is necessary. The individual marker is a fluorescent marker of different colors. In other words, each individual marker has a different colored fluorescent marker. The board 2 is replaced on the conveyor 1 and moves down the conveyor system 1 to the apparatus 5. By means of a signal generated either by the conveyor 1 itself or by the process controls of the trimmer or a photo-electric cell, the apparatus 5 is instructed that a board 2 is below it at that time. The strobe 8 is then signalled to flash. The UV filters 13,14 allow only ultraviolet light to strike the board 2. The fluorescent mark 50 fluoresces and the camera 10 or cameras 10,11 have a filter system 15,16 on them. In one embodiment, the filter for one of the cameras allows only red and orange to pass through and on the other camera only green and blue is allowed to pass through. One image is used to recognize the mark 50. By comparing the signal ratio received by each camera, the color is detected. If one RGB camera is used, the colors are separated into read, green and blue. A signal ratio algorithm is used to detect color. After processing and solution, the marks 50 are identified and the color of each mark is identified. That information is then sent to the trimmer 3 and to a video screen 4, either in real time or for later review, and can be used for generating management information reports 7. Specifically, each grader 51,52,53 can be reviewed because each grader is using different colors. Thus, it is possible to generate a management report 7 which shows how many pieces of wood each grader grades, and the grading performance. The error rate is calculated down stream. Any reject or problem with the character recognition requires the board to pass through the trimmer without being cut and then diverted to a bin to be rerun through the process.

The manual system in the prior art would allow an error rate of 1 to 2 percent at 40 lugs per minute. The error rate of the manual system would rise to three to five percent when the lug rate was placed at 70. Under the described prior art line scan camera there is a one to two percent error rate at 72 lugs per minute. Under this invention, the error rate at 72 lugs per minute is one-half percent or less. This is due primarily to the high intensity strobe and the speed of the strobe and camera.

The strobe flashes a maximum of 1 millisecond and the camera aperture is open for a maximum of 100 millisecond. The is preferred to be a xenon flash lamp. Finally, the strobe must produce a minimum of 25 joules per area in $m^2$ per meters of stand off distance.

The method comprises the following steps:
1. Placing Fluorescent marks on an object;
2. Flashing a strobe light on said marks;
3. Detecting said marks;
4. Processing, solving and interpreting said marks; and
5. Communicating said solution to other devices.

The method also comprising using and detecting different color fluorescent marks.

While the specific example relates to the wood products or lumber, it is clear that any object that requires grading use this apparatus.

We claim:

1. An apparatus for reading information marks comprising:
   at least one strobe light to activate or reflect marks on a product where said strobe light is on for a short time at high intensity such that the movement of the product does not affect the reading of the marks;
   at least one camera for reading marks;
   a means to time the strobe light such that an object is positioned under said strobe light and said camera;
   means to process, solve and interpret character and color recognition; and
   means to report the solution to other control system devices.

2. The apparatus of claim 1 where said means to time the strobe light is a photo-electric eye.

3. The apparatus of claim 1 where said means to time the strobe light is a signal from a control device.

4. The apparatus of claim 1 where said camera is an RGB color camera.

5. The apparatus of claim 1 where said means to process, solve and interpret character and color recognition is a central processing unit.

6. The apparatus of claim 1 additionally comprising means to transfer the recognized marks to reporting system devices.

7. The apparatus of claim 1 additionally comprising:
   a monitor for reviewing the marks as read by said camera.

8. An apparatus for reading information marks comprising:
   two strobe lights operating simultaneously to activate fluorescent marks on lumber where said strobe lights are on for a short time, such that the movement of the lumber does not affect the reading of the fluorescent marks;
   two cameras for reading fluorescent marks where one camera responds to red and orange fluorescents and the other camera responds to green and blue fluorescents;
   a means to time said strobe lights such that a piece of lumber is positioned under said strobe lights and said cameras;
   means to transfer the fluorescent marks as read by said camera to other devices;
   means to process, solve and interpret character and color recognition; and
   means to transfer the solution to other control system devices.

9. The apparatus of claim 8 where said means to time the strobe light is a signal from a control device.

10. The apparatus of claim 8 additionally comprising means to transfer the recognized marks to a reporting system device.

11. The apparatus of claim 8 additionally comprising a monitor for reviewing the fluorescent marks as read by said camera.

12. The apparatus of claim 8 where said means to process, solve and interpret character and color recognition comprises a central processing unit which compares a signal ratio from each camera to detect color, and uses one of the images for character recognition.

13. An apparatus for reading information marks comprising:
- at least one strobe light to fluoresce marks on wood where said strobe light is on for a short time at high intensity such that the movement of the wood does not affect the reading of the marks;
- at least one camera for reading fluorescent marks;
- a means to time the strobe light such that a piece of wood is positioned under said strobe light and said camera;
- means to process, solve and interpret character and color recognition; and
- means to transfer the solution to other control system devices.

14. The apparatus of claim 13 where said means to time the strobe light is a photo-electric eye.

15. The apparatus of claim 13 where said means to time the strobe light is a signal from a control device.

16. The apparatus of claim 13 where said camera is an RGB color camera.

17. The apparatus of claim 13 where said means to process, solve and interpret character and color recognition is a central processing unit.

18. The apparatus of claim 13 additionally comprising means to transfer the recognized marks to reporting system devices.

19. The apparatus of claim 13 additionally comprising:
- a monitor for reviewing the marks as read by said camera.

20. The strobe of claim 13 where said strobe produces the energy per area illuminated per stand off distance is a minimum of 25 joules per illuminated area in square meters per meters of stand off distance.

21. The camera and strobe of claim 13 where said camera aperture is open for a maximum of 100 milliseconds and said strobe flashes a maximum of 1 millisecond.

22. The strobe of claim 13 where said strobe is a xenon flash lamp.

23. The apparatus of claim 16 where said RGB color camera detects color by means of separating colors into red, green and blue such that a signal ratio algorithm detects colors.

24. The method for detecting and interpreting marks comprising the following steps:
1. Placing fluorescent marks on an object;
2. Flashing a strobe light on said marks;
3. Detecting said marks;
4. Processing, solving and interpreting said marks; and
5. Communicating said solution to other devices.

25. The method of claim 24 where the color of said fluorescent marks is detected and interpreted.

* * * * *